(12) United States Patent
Fujita et al.

(10) Patent No.: US 9,109,142 B2
(45) Date of Patent: *Aug. 18, 2015

(54) PHOTOCURABLE ADHESIVE COMPOSITION, PHOTOCURABLE ADHESIVE LAYER, AND PHOTOCURABLE ADHESIVE SHEET

(75) Inventors: Shigeru Fujita, Ibaraki (JP); Yutaka Moroishi, Ibaraki (JP); Fumiko Nakano, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 446 days.

This patent is subject to a terminal disclaimer.

(21) Appl. No.: 13/375,007

(22) PCT Filed: Apr. 28, 2010

(86) PCT No.: PCT/JP2010/057554
§ 371 (c)(1),
(2), (4) Date: Nov. 29, 2011

(87) PCT Pub. No.: WO2010/140442
PCT Pub. Date: Dec. 9, 2010

(65) Prior Publication Data
US 2012/0094119 A1 Apr. 19, 2012

(30) Foreign Application Priority Data
Jun. 1, 2009 (JP) .................... 2009-132229

(51) Int. Cl.
C09J 7/02 (2006.01)
C08F 265/06 (2006.01)
C09J 4/06 (2006.01)
C09J 151/00 (2006.01)

(52) U.S. Cl.
CPC .............. *C09J 7/021* (2013.01); *C08F 265/06* (2013.01); *C09J 4/06* (2013.01); *C09J 151/003* (2013.01); *C09J 2451/00* (2013.01); *Y10T 428/2891* (2015.01)

(58) Field of Classification Search
CPC ........ C09J 7/0021; C09J 4/06; C09J 151/003; C09J 245/10; C09J 220/32; C08F 256/06; Y01T 428/2891
See application file for complete search history.

(56) References Cited

U.S. PATENT DOCUMENTS

| 5,442,103 | A | 8/1995 | Iwane et al. |
| 5,476,572 | A * | 12/1995 | Prough .................... 162/246 |
| 5,476,752 | A | 12/1995 | Noguchi et al. |
| 5,578,683 | A | 11/1996 | Koch et al. |
| 5,951,999 | A | 9/1999 | Therriault et al. |
| 6,180,200 | B1 | 1/2001 | Ha et al. |
| 6,455,121 | B1 | 9/2002 | Ha et al. |
| 8,200,059 | B2 | 6/2012 | Shibata et al. |
| 2009/0291227 | A1 | 11/2009 | Niwa et al. |
| 2009/0292095 | A1 | 11/2009 | Niwa et al. |
| 2010/0129045 | A1 | 5/2010 | Shibata et al. |
| 2012/0244349 | A1 | 9/2012 | Fujita et al. |

FOREIGN PATENT DOCUMENTS

| CA | 2105102 | 3/1994 |
| CN | 1085234 | 4/1994 |
| CN | 1303423 | 7/2011 |
| EP | 2 128 213 A1 | 12/2009 |
| EP | 2 549 303 | 1/2013 |
| JP | 63-196676 | 8/1988 |
| JP | 63-260978 | 10/1988 |
| JP | 06-041506 A | 2/1994 |
| JP | 10-140095 A | 5/1998 |
| JP | 11-043660 A | 2/1999 |
| JP | 11-116903 A | 4/1999 |
| JP | 2003-147311 | 5/2003 |
| JP | 2006-104328 A | 4/2006 |
| JP | 2008-174667 | 7/2008 |
| WO | WO 2008/114696 A1 | 9/2008 |

OTHER PUBLICATIONS

Notification of Transmittal of translation of the international preliminary report on patentability issued by the International Bureau of WIPO in the corresponding PCT patent application No. PCT/JP2010/057554 on Dec. 12, 2011.
International Search Report mailed by Japanese Patent Office on Jul. 20, 2010 in the corresponding PCT patent application No. PCT/JP2010/057554.
Notice of Rejection Decision dated Sep. 2, 2013 in corresponding Korean patent application No. 10-2011-7008203.
First Office Action dated Jul. 2, 2013 in Chinese patent application No. 201080054663.1.
Extended European Search Report dated Sep. 6, 2013 in corresponding patent application No. 10783226.3.
Notification of Reasons for Refusal dated Sep. 4, 2013 in corresponding Japanese patent application No. 2009-132229.
First Office Action dated Apr. 11, 2013 in corresponding Chinese patent application No. 201080024169.0.
Extended European Search Report, dated Feb. 9, 2015, in European Patent Application No. 10834567.9.
TW Office Action dated Jul. 7, 2014 in corresponding Taiwanese Patent Application No. 099114688.
Odian, G.: "Principles of polymerization", Fourth Edition, 2004, Wiley-Interscience, New Jersey, pp. 752-754.
Examination Report dated May 21, 2014 in corresponding European Patent Application No. 10783226.3.

* cited by examiner

*Primary Examiner* — Sanza McClendon
(74) *Attorney, Agent, or Firm* — Knobbe Martens Olson and Bear, LLP

(57) ABSTRACT

A photocurable pressure-sensitive adhesive composition, a photocurable pressure-sensitive adhesive layer, and a photocurable pressure-sensitive adhesive sheet including a support and such a photocurable pressure-sensitive adhesive layer formed on at least one side of the support are provided. The photocurable pressure-sensitive adhesive composition can form an adhesive layer that has sufficient initial adhesive strength through the process of drying and cross-linking without having any adhesive protruding at normal temperatures and pressures, hardens easily with light irradiation, and has a high peeling resistance. The photocurable adhesive composition contains a graft polymer that graft-polymerizes a monomer containing a cyclic ether group to a (meth)acrylic polymer and a cationic photopolymerization initiator. The photocurable adhesive layer and the photocurable adhesive sheet are prepared by using said photocurable adhesive composition.

14 Claims, No Drawings

PHOTOCURABLE ADHESIVE COMPOSITION, PHOTOCURABLE ADHESIVE LAYER, AND PHOTOCURABLE ADHESIVE SHEET

This application is the U.S. National Phase under 35 U.S.C. §371 of International Application No. PCT/JP2010/057554, filed Apr. 28, 2010, which claims priority to Japanese Patent Application No. 2009-132229, filed Jun. 1, 2009. The International Application was not published in English under PCT Article 21(2).

TECHNICAL FIELD

The present invention relates to a photocurable pressure-sensitive adhesive composition, a photocurable pressure-sensitive adhesive layer, and a photocurable pressure-sensitive adhesive sheet including a support and such a photocurable pressure-sensitive adhesive layer formed on at least one side of the support.

BACKGROUND ART

In recent years, pressure-sensitive adhesives have been used to bond, to a liquid crystal cell, an optical member such as a polarizing plate or a retardation plate for use in an electronic part such as a liquid crystal display device. Acryl-based pressure-sensitive adhesives have been widely used as such pressure-sensitive adhesives, because they have a high level of heat resistance and light resistance.

Unfortunately, acryl-based pressure-sensitive adhesives have not been able to exhibit high peeling resistance like adhesives do.

A thermosetting adhesive sheet capable of being cured by heat treatment has also been proposed for applications where electronic parts are bonded. Such a thermosetting adhesive has a high level of adhering strength and heat resistance but has no tackiness for adhesion at room temperature, which makes it difficult to achieve temporary bonding. In addition, before curing, the adhesive component contains a relatively large amount of a low molecular weight component, which may cause a problem such as oozing during bonding. Therefore, there has been a demand for an adhesive sheet that can exhibit moderate adherability to serve as a pressure-sensitive adhesive at the initial stage of bonding to the adherend and can also exhibit tackiness and heat resistance as high as those of an adhesive after bonding.

For example, there has been proposed a curable thermobonding sheet including an acrylic polymer, an epoxy group-containing resin, a photo-initiator, and a tackifier resin (Patent Document 1). Unfortunately, such a sheet contains a low molecular weight epoxy resin, and therefore, it is difficult to prevent oozing and the like when temporary bonding is performed using such a sheet.

PRIOR ART DOCUMENT

Patent Document

Patent Document 1: Japanese Patent Application Laid-Open (JP-A) No. 10-140095

SUMMARY OF THE INVENTION

Problems to be Solved by the Invention

An objective of the present invention is to provide a photocurable pressure-sensitive adhesive composition that does not cause oozing or the like at room temperature and atmospheric pressure, has a sufficient initial adhesive power when dried and crosslinked, can be easily cured by light irradiation, and can form a pressure-sensitive adhesive layer having high peeling resistance.

Another objective of the present invention is to provide a photocurable pressure-sensitive adhesive layer and a photocurable pressure-sensitive adhesive sheet each formed using such a photocurable pressure-sensitive adhesive composition.

Means for Solving the Problems

As a result of earnest studies to solve the above problems, the inventors have found the photocurable pressure-sensitive adhesive composition described below and accomplished the invention.

Specifically, the present invention is directed to a photocurable pressure-sensitive adhesive composition, including: a graft polymer including a (meth)acryl-based polymer and a chain that contains a cyclic ether group-containing monomer component and that is graft-polymerized onto the (meth)acryl-based polymer; and a cationic photopolymerization initiator.

The graft polymer preferably includes the (meth)acryl-based polymer and a chain that has the cyclic ether group-containing monomer component and another monomer component and is graft-polymerized onto the (meth)acryl-based polymer.

The cyclic ether group-containing monomer component and another monomer component are preferably in a weight ratio of 90:10 to 10:90.

The photocurable pressure-sensitive adhesive composition preferably further includes a crosslinking agent.

The photocurable pressure-sensitive adhesive composition preferably further includes 5 to 100 parts by weight of an epoxy resin and/or an oxetane resin, based on 100 parts by weight of the graft polymer.

In the photocurable pressure-sensitive adhesive composition, the cyclic ether group-containing monomer is preferably one or both of an epoxy group-containing monomer and an oxetane group-containing monomer.

In the photocurable pressure-sensitive adhesive composition, the (meth)acryl-based polymer preferably has a glass transition temperature of 250 K or less.

In the photocurable pressure-sensitive adhesive composition, the (meth)acryl-based polymer preferably contains 0.2 to 10% by weight of a hydroxyl group-containing monomer as monomer unit, based on the total amount of the (meth)acryl-based polymer.

In the photocurable pressure-sensitive adhesive composition, the graft polymer is preferably a product of graft polymerization of 100 parts by weight of the (meth)acryl-based polymer, 2 to 50 parts by weight of the cyclic ether group-containing monomer, and 5 to 50 parts by weight of another monomer in the presence of 0.02 to 5 parts by weight of a peroxide.

In the photocurable pressure-sensitive adhesive composition, the cationic photopolymerization initiator is preferably at least one selected from the group consisting of an allylsulfonium hexafluorophosphate salt, a sulfonium hexafluorophosphate salt, and bis(alkylphenyl)iodonium hexafluorophosphate.

The present invention is also directed to a photocurable pressure-sensitive adhesive layer including a crosslinking product of the photocurable pressure-sensitive adhesive composition according to any of the aspects described above.

The present invention is also directed to a photocurable pressure-sensitive adhesive sheet, including: a support; and the above pressure-sensitive adhesive layer for an optical member formed on at least one side of the support.

The present invention is also directed to a method for producing the photocurable pressure-sensitive adhesive composition according to any of the above aspects, including the steps of:

preparing a (meth)acryl-based polymer and then graft-polymerizing a cyclic ether group-containing monomer onto the (meth)acryl-based polymer to prepare a graft polymer; and mixing a cationic photopolymerization initiator with the graft polymer.

In the step of preparing a graft polymer, preparing the (meth)acryl-based polymer is preferably followed by graft-polymerizing a cyclic ether group-containing monomer and another monomer onto the (meth)acryl-based polymer.

Effects of the Invention

The photocurable pressure-sensitive adhesive composition of the present invention does not cause oozing or the like at room temperature and atmospheric pressure, has a sufficient initial adhesive power when dried and crosslinked, can be easily cured by light irradiation, and can form a pressure-sensitive adhesive layer having high peeling resistance. In the manufacturing process, the graft polymer to be present in the photocurable pressure-sensitive adhesive composition of the present invention maintains fluidity and therefore is easy to handle, so that the resulting composition can have good processability and good final tackiness.

The photocurable pressure-sensitive adhesive layer and the photocurable pressure-sensitive adhesive sheet according to the present invention also have good heat resistance.

EMBODIMENTS FOR CARRYING OUT THE INVENTION

The photocurable pressure-sensitive adhesive composition of the present invention includes: a graft polymer including a (meth)acryl-based polymer and a chain that has a cyclic ether group-containing monomer component and optionally any other monomer component and that is graft-polymerized onto the (meth)acryl-based polymer; and a cationic photopolymerization initiator.

Any (meth)acrylate may be used without restriction as a monomer unit to form the (meth)acryl-based polymer. For example, an alkyl (meth)acrylate having an alkyl group of 4 or more carbon atoms preferably makes up 50% by weight or more of the total monomer units of the (meth)acryl-based polymer.

As used herein, the simple term "alkyl (meth)acrylate" refers to a (meth)acrylate having a straight or branched chain alkyl group. The number of carbon atoms in the alkyl group should be 4 or more, preferably from 4 to 9. The term "(meth)acrylate" refers to acrylate and/or methacrylate, and "(meth)" is used in the same meaning in the description.

Examples of the alkyl (meth)acrylate include n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, isomyristyl (meth)acrylate, n-tridecyl (meth)acrylate, n-tetradecyl (meth)acrylate, stearyl (meth)acrylate, and isostearyl (meth)acrylate. Particular examples include n-butyl (meth)acrylate and 2-ethylhexyl (meth)acrylate, and these may be used alone or in combination.

In an embodiment of the present invention, the amount of the alkyl (meth)acrylate is 50% by weight or more, preferably 80% by weight or more, more preferably 90% by weight or more, based on the total amount of all monomer components for the (meth)acrylic polymer. All the monomers may be alkyl (meth)acrylates, but the amount of an alkyl (meth)acrylate or alkyl (meth)acrylates is preferably 99% by weight or less and may be 98% by weight or less or 97% by weight or less.

In an embodiment of the present invention, the (meth)acryl-based polymer preferably includes, as another component, a hydroxyl group-containing monomer component having at least one hydroxyl group in an alkyl group. Specifically, this monomer is a monomer containing a hydroxyalkyl group with one or more hydroxyl groups. In this monomer, the hydroxyl group is preferably present at the end of the alkyl group. The number of carbon atoms in the alkyl group is preferably from 4 to 12, more preferably from 4 to 8, even more preferably from 4 to 6. The addition of such a hydroxyl group-containing monomer may have a good effect on the position where hydrogen is withdrawn during the graft polymerization or on the compatibility between the graft polymer and a homopolymer of the cyclic ether group-containing monomer, which is produced during the graft polymerization, and therefore, it is considered to be useful for the production of a graft polymer having good heat resistance.

Any monomer having a hydroxyl group and an unsaturated double bond-containing polymerizable functional group such as a (meth)acryloyl group may be used as such a monomer. Examples of such a monomer include hydroxyalkyl (meth)acrylate such as 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, or 12-hydroxylauryl (meth)acrylate; 4-hydroxymethylcyclohexyl (meth)acrylate, and 4-hydroxybutyl vinyl ether. Among them, hydroxyalkyl (meth)acrylate is preferably used.

The amount of the hydroxyl group-containing monomer is preferably 0.2% by weight or more, more preferably 0.5% by weight or more, and preferably 10% by weight or less, more preferably 3% by weight or less, based on the total amount of the monomers used to form the (meth)acryl-based polymer. It is most preferably from 1% by weight to 3% by weight.

Besides the above monomers, an unsaturated carboxylic acid-containing monomer may also be used as a monomer component to form the (meth)acryl-based polymer.

Any monomer having a carboxyl group and an unsaturated double bond-containing polymerizable functional group such as a (meth)acryloyl group or a vinyl group may be used without restriction as the unsaturated carboxylic acid-containing monomer. Examples of the unsaturated carboxylic acid-containing monomer include (meth)acrylic acid, carboxyethyl (meth)acrylate, carboxypentyl (meth)acrylate, itaconic acid, maleic acid, fumaric acid, and crotonic acid. These may be used alone or in any combination. Among these, (meth)acrylic acid, particularly, acrylic acid is preferably used.

The unsaturated carboxylic acid-containing monomer is preferably used in an amount of 0.01 to 2% by weight, more preferably 0.05 to 2% by weight, even more preferably 0.05 to 1.5% by weight, in particular, preferably 0.1 to 1% by weight, based on the total amount of the monomer components used to form the (meth)acryl-based polymer.

Other copolymerizable monomers may also be used alone or in combination as a monomer component(s) to form the (meth)acryl-based polymer, as long as the objects of the present invention are not hindered. Examples of other copolymerizable monomers include aromatic-ring containing monomers having an aromatic ring and an unsaturated double bond-containing polymerizable functional group such as a (meth)acryloyl group or a vinyl group. Examples of aromatic ring-containing monomers include phenoxyethyl (meth)acrylate, benzyl (meth)acrylate, phenol ethylene oxide-modified (meth)acrylate, 2-naphthoethyl (meth)acrylate, 2-(4-methoxy-1-naphthoxy)ethyl (meth)acrylate, phenoxypropyl (meth)acrylate, phenoxydiethylene glycol (meth)acrylate, and polystyryl (meth)acrylate.

Examples also include acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate; and alkoxyalkyl (meth)acrylate monomers such as methoxyethyl (meth)acrylate and ethoxyethyl (meth)acrylate.

Also, vinyl monomers such as vinyl acetate, vinyl propionate, styrene, α-methylstyrene, and N-vinylcaprolactam; epoxy group-containing monomers such as glycidyl (meth)acrylate, methylglycidyl (meth)acrylate, and 3,4-epoxycyclohexylmethyl (meth)acrylate; glycol acrylate monomers such as polyethylene glycol (meth)acrylate, polypropylene glycol (meth)acrylate, methoxyethylene glycol (meth)acrylate, and methoxypolypropylene glycol (meth)acrylate; acrylate monomers such as tetrahydrofurfuryl (meth)acrylate, fluoro(meth)acrylate, silicone (meth)acrylate, and 2-methoxyethyl acrylate; and amide group-containing monomers, amino group-containing monomers, imide group-containing monomers, N-acryloylmorpholine, and vinyl ether monomers.

The (meth)acrylic polymer of the present invention has a weight average molecular weight of 600,000 or more, preferably 700,000 or more, and 3,000,000 or less. The weight average molecular weight may refer to a polystyrene-equivalent weight average molecular weight measured and calculated by gel permeation chromatography (GPC).

The (meth)acrylic polymer may be produced by any appropriately selected known method such as solution polymerization, bulk polymerization, emulsion polymerization, or various types of radical polymerization. The resulting (meth)acrylic polymer may be any of a random copolymer, or a block copolymer.

In solution polymerization, for example, ethyl acetate, toluene or the like is used as a polymerization solvent. An example of solution polymerization includes performing the reaction under a stream of inert gas such as nitrogen in the presence of a polymerization initiator typically under the reaction conditions of a temperature of about 50 to about 70° C. and a time period of about 5 to about 30 hours.

Any appropriately selected polymerization initiator, chain transfer agent, emulsifying agent, or the like may be used for radical polymerization. The weight average molecular weight of the (meth)acrylic polymer may be controlled by the amount of addition of the polymerization initiator or the chain transfer agent or by the reaction conditions. The amount of the addition may be controlled as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

The above polymerization initiators may be used alone or in combination of two or more thereof. The total content of the polymerization initiator is preferably from about 0.005 to about 1 part by weight, more preferably from about 0.02 to about 0.5 part by weight, based on 100 parts by weight of the monomer(s).

For example, when the (meth)acrylic polymer with a weight average molecular weight as stated above is produced using 2,2'-azobisisobutylonitrile as a polymerization initiator, the amount of the polymerization initiator is preferably from about 0.06 to about 0.2 part by weight, more preferably from about 0.08 to about 0.175 part by weight, based on 100 parts by weight of all the monomer components.

Examples of the chain transfer agent include lauryl mercaptan, glycidyl mercaptan, mercaptoacetic acid, 2-mercaptoethanol, thioglycolic acid, 2-ethylhexyl thioglycolate, and 2,3-dimercapto-1-propanol. The chain transfer agents may be used alone or in combination of two or more thereof. The total content of the transfer agent(s) should be about 0.1 part by weight or less, based on 100 parts by weight of all the monomers.

Examples of the emulsifier for use in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone or in combination of two or more thereof.

Examples of a reactive emulsifier having an introduced radical-polymerizable functional group such as a propenyl group or an allyl ether group include Aqualon HS-10, HS-20, KH-10, BC-05, BC-10, and BC-20 (each manufactured by DAI-ICHI KOGYO SEIYAKU CO., LTD.) and ADEKA REASOAP SE10N (manufactured by ADEKA CORPORATION). The reactive emulsifier is preferred, because after polymerization, it can be incorporated into a polymer chain to improve water resistance. Based on 100 parts by weight of all the monomer components, the emulsifier is preferably used in an amount of 0.3 to 5 parts by weight, more preferably of 0.5 to 1 part by weight, in view of polymerization stability or mechanical stability.

The glass transition temperature of the (meth)acrylic polymer is 250 K or less and preferably, 240 K or less. Also, the glass transition temperature of the (meth)acrylic polymer is preferably 200 K or more. When the glass transition temperature or the (meth)acrylic polymer is 250 K or less, the resulting final pressure-sensitive adhesive composition can have high heat resistance and excellent in internal cohesion. The polymer of such a glass transition temperature can be adjusted by varying kind of monomers or ratio of monomers used. Such glass transition may be obtained by a process including performing solution polymerization with 0.06 to 0.2 parts of a polymerization initiator such as azobisisobutyronitrile or benzoyl peroxide and performing the reaction with a polymerization solvent such as ethyl acetate under a nitrogen stream at 50° C. to 70° C. for 8 to 30 hours. The glass transition temperature (Tg) may be calculated from the following Fox formula: $1/Tg=W1/Tg1+W2/Tg2+W3/Tg3+\ldots$, wherein Tg1, Tg2, Tg3, and so on each represent the glass transition temperature (expressed by absolute temperature) of each of homopolymers 1, 2, 3, and so on of the copolymerized components, and W1, W2, W3, and so on each represent the weight fraction of each copolymerized component. The glass transition temperature (Tg) of each homopolymer was obtained from Polymer Handbook, 4th edition, John Wiley & Sons. Inc.

Subsequently, the resulting (meth)acryl-based polymer is directly subjected to graft polymerization, or a solution obtained by diluting the resulting (meth)acryl-based polymer with a diluent is subjected to graft polymerization.

Examples of the diluent include, but are not limited to, ethyl acetate and toluene.

The graft polymerization is performed by allowing the cyclic ether group-containing monomer and optionally, other monomer(s) than the cyclic ether group-containing monomer, to react with the (meth)acryl-based polymer.

In this process, the cyclic ether group-containing monomer is preferably, but not limited to, an epoxy group-containing monomer, an oxetane group-containing monomer, or a combination of both monomers.

For example, the epoxy group-containing monomer may be glycidyl acrylate, glycidyl methacrylate, 3,4-epoxycyclohexylmethyl acrylate, 3,4-epoxycyclohexylmethyl methacrylate, or 4-hydroxybutyl acrylate glycidyl ether, and these may be used alone or in any combination.

For example, the oxetane group-containing monomer may be 3-oxetanylmethyl (meth)acrylate, 3-methyl-3-oxetanylmethyl (meth)acrylate, 3-ethyl-3-oxetanylmethyl (meth)acrylate, 3-butyl-3-oxetanylmethyl (meth)acrylate, or 3-hexyl-3-oxetanylmethyl (meth)acrylate, and these may be used alone or in any combination.

The amount of the cyclic ether group-containing monomer is preferably 2 parts by weight or more, more preferably 3 parts by weight or more, based on 100 parts by weight of the (meth)acryl-based polymer. The upper limit of the amount is preferably, but not limited to, 100 parts by weight or less, more preferably 50 parts by weight or less, even more preferably 30 parts by weight or less. If the amount of the cyclic ether group-containing monomer is 2 parts by weight or more, the function of the composition as a pressure-sensitive adhesive can be sufficiently produced, but if it is 100 parts by weight or more, the composition may have reduced tackiness so that it may be less tacky at the initial stage.

In the graft polymerization, any other monomer capable of undergoing co-grafting may also be used together with the cyclic ether group-containing monomer. Such a monomer may be any monomer containing no cyclic ether group, for example, which may be alkyl (meth)acrylate of 1 to 9 carbon atoms. Examples of alkyl (meth)acrylate include methyl (meth)acrylate, ethyl (meth)acrylate, n-butyl (meth)acrylate, and 2-ethylhexyl acrylate. Alicyclic (meth)acrylates such as cyclohexyl (meth)acrylate and isobornyl (meth)acrylate may also be used. These may be used alone or in any combination.

When such an additional monomer capable of undergoing co-grafting is used, the light irradiation dose for curing the pressure-sensitive adhesive can be reduced. This is considered to be because of an increase in the mobility of the grafted chain or an increase in the compatibility between the backbone polymer and the grafted chain or the ungrafted chain as a by-product.

It is also preferred that such an additional monomer should be selected from the same monomers as those used to form the main chain (backbone), namely, the (meth)acryl-based polymer.

When any other monomer than the cyclic ether group-containing monomer is added, the weight ratio of the cyclic ether group-containing monomer to any other monomer is preferably from 90/10 to 10/90, more preferably from 80/20 to 20/80. If the content of any other monomer is low, the effect of reducing the light irradiation dose for curing may be insufficient, and if it is high, peeling resistance may increase after the light irradiation.

The graft polymerization conditions are not restricted, and the graft polymerization may be performed by methods known to those skilled in the art. In the polymerization, a peroxide is preferably used as a polymerization initiator.

The amount of such a polymerization initiator may be from 0.02 to 5 parts by weight, based on 100 part by weight of the (meth)acryl-based polymer. If the amount of the polymerization initiator is small, it may take too long to complete the graft polymerization reaction, and if the amount of the polymerization initiator is large, a large amount of a homopolymer of the cyclic ether group-containing monomer may be produced, which is not preferred.

In the case of solution polymerization, for example, the graft polymerization may be performed by a non-limiting process including adding the cyclic ether group-containing monomer and a solvent capable of controlling viscosity to a solution of the acryl-based copolymer, replacing the air with nitrogen, then adding 0.02 to 5 parts by weight of a peroxide polymerization initiator such as dibenzoyl peroxide to the mixture, and heating the mixture at 50° C. to 80° C. for 4 to 15 hours.

The properties (such as the molecular weight of the graft polymer and the size of the branched part of the graft polymer) of the graft polymer to be obtained can be selected as appropriate using the reaction conditions.

The pressure-sensitive adhesive composition of the present invention includes the graft polymer obtained as described above and a cationic photopolymerization initiator.

The cationic photopolymerization initiator to be used is preferably any of cationic photopolymerization initiators known to those skilled in the art. More specifically, at least one selected from the group consisting of an allylsulfonium hexafluorophosphate salt, a sulfonium hexafluorophosphate salt, and bis(alkylphenyl)iodonium hexafluorophosphate may be used.

Such cationic photopolymerization initiators may be used alone or in combination of two or more, and the total content of the cationic photopolymerization initiator(s) should be from 0.1 to 5 parts by weight, preferably from 0.3 to 3 parts by weight, based on 100 parts by weight of the (meth)acryl-based polymer.

If necessary, a crosslinking agent may be added to the photocurable pressure-sensitive adhesive composition of the present invention. The crosslinking agent is typically, but not limited to, an isocyanate crosslinking agent which is a compound having two or more isocyanate groups (which may include functional groups that are temporarily protected with an isocyanate blocking agent or by oligomerization and are convertible to isocyanate groups) per molecule.

Examples of the isocyanate crosslinking agent include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of the isocyanate crosslinking agent include lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (Coronate L (trade name) manufactured by NIPPON POLYURETHANE INDUSTRY CO., LTD.), a trimethylolpropane-hexamethylene diisocyanate trimer adduct (CORONATE HL (trade name) manufactured by NIPPON POLYURETHANE INDUSTRY CO., LTD.) and an isocyanurate of hexamethylene diisocyanate (CORONATE HX (trade name) manufactured by NIPPON POLYURETHANE INDUSTRY CO., LTD.); polyether polyisocyanates and polyester polyisocyanates; adducts thereof with various polyols; and polyisocyanates polyfunctionalized with an isocyanurate bond, a biuret bond, an allophanate bond, or the like. In particular, aliphatic isocyanates are preferably used, because of their high reaction speed.

One of the isocyanate crosslinking agents may be used alone, or two or more of the isocyanate crosslinking agents may be used in combination. The total content of the isocyanate compound crosslinking agent(s) is preferably from 0.01 to 2 parts by weight, more preferably from 0.05 to 1.5 parts by weight, based on 100 parts by weight of the (meth)acrylic polymer. The content may be appropriately determined taking into account cohesive strength, prevention of delamination in a durability test, or the like.

An organic crosslinking agent or a polyfunctional metal chelate may also be used together as the crosslinking agent. The organic crosslinking agent may be an epoxy crosslinking agent (which is intended to include a compound having two or more epoxy groups per molecule). Examples of such an epoxy crosslinking agent include ethylene glycol diglycidyl ether, propylene glycol diglycidyl ether, terephthalic acid diglycidyl ester acrylate, and spiroglycol diglycidyl ether. These may be used alone or in combination of two or more.

The polyfunctional metal chelate is composed of an organic compound and a polyvalent metal that is covalently or coordinately bonded to the organic compound. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include an alkyl ester, an alcohol compound, a carboxylic acid compound, an ether compound, and a ketone compound.

In an embodiment of the present invention, an oxazoline crosslinking agent or a peroxide may be further added as the crosslinking agent.

Any oxazoline crosslinking agent having an oxazoline group in the molecule may be used without restriction. The oxazoline group may be any of a 2-oxazoline group, a 3-oxazoline group, or a 4-oxazoline group. The oxazoline crosslinking agent is preferably a copolymer of an addition-polymerizable oxazoline and an unsaturated monomer, in particular, which is preferably produced using 2-isopropenyl-2-oxazoline as the addition-polymerizable oxazoline. Examples include EPOCROS WS-500 (trade name) manufactured by NIPPON SHOKUBAI CO., LTD., etc.

Any peroxide crosslinking agent capable of producing active radical species by heating and promoting the crosslinking of the base polymer in the pressure-sensitive adhesive composition may be appropriately used. In view of workability or stability, a peroxide with a one-minute half-life temperature of 80° C. to 160° C. is preferably used, and a peroxide with a one-minute half-life temperature of 90° C. to 140° C. is more preferably used.

Examples of peroxides that may be used include di(2-ethylhexyl) peroxydicarbonate (one-minute half-life temperature: 90.6° C.), di(4-tert-butylcyclohexyl) peroxydicarbonate (one-minute half-life temperature: 92.1° C.), di-sec-butyl peroxydicarbonate (one-minute half-life temperature: 92.4° C.), tert-butyl peroxyneodecanoate (one-minute half-life temperature: 103.5° C.), tert-hexyl peroxypivalate (one-minute half-life temperature: 109.1° C.), tert-butyl peroxypivalate (one-minute half-life temperature: 110.3° C.), dilauroyl peroxide (one-minute half-life temperature: 116.4° C.), di-n-octanoylperoxide (one-minute half-life temperature: 117.4° C.), 1,1,3,3-tetramethylbutylperoxy-2-ethyl hexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), tert-butyl peroxyisobutylate (one-minute half-life temperature: 136.1° C.), and 1,1-di(tert-hexylperoxy)cyclohexane (one-minute half-life temperature: 149.2° C.). In particular, di(4-tert-butylcyclohexyl) peroxydicarbonate (one-minute half-life temperature: 92.1° C.), dilauroyl peroxide (one-minute half-life temperature: 116.4° C.), dibenzoyl peroxide (one-minute half-life temperature: 130.0° C.), or the like is preferably used, because they can provide high crosslinking reaction efficiency.

The half life of the peroxide is an indicator of how fast the peroxide can be decomposed and refers to the time required for the remaining amount of the peroxide to reach one half of the original amount. The decomposition temperature required for a certain half life and the half life time obtained at a certain temperature are shown in catalogs furnished by manufacturers, such as "Organic Peroxide Catalog, 9th Edition, May, 2003" furnished by NOF CORPORATION.

One of the peroxides may be used alone, or two or more of the peroxides may be used in combination. The total content of the peroxide(s) should be from 0.01 to 2 parts by weight, preferably from 0.04 to 1.5 parts by weight, based on 100 parts by weight of the (meth)acrylic polymer. The content may be appropriately selected within this range so that workability, re-workability, crosslink stability, peelability, or the like can be controlled.

The amount of decomposition of the peroxide may be determined by measuring the peroxide residue after the reaction process by high performance liquid chromatography (HPLC).

More specifically, for example, after the reaction process, about 0.2 g of each pressure-sensitive adhesive composition is taken out and immersed in 10 ml of ethyl acetate and subjected to shaking extraction at 25° C. and 120 rpm for 3 hours in a shaker and then allowed to stand at room temperature for 3 days. Thereafter, 10 ml of acetonitrile is added, and the mixture is shaken at 25° C. and 120 rpm for 30 minutes. About 10 µl of the liquid extract obtained by filtration through a membrane filter (0.45 µm) is subjected to HPLC by injection and analyzed so that the amount of the peroxide after the reaction process is determined.

When a pressure-sensitive adhesive layer is formed using the crosslinking agent, the total amount of the added crosslinking agents should be controlled, and the effects of the crosslinking temperature and the crosslinking time should be fully taken into account.

The photocurable pressure-sensitive adhesive composition of the present invention may further contain an epoxy resin or an oxetane resin for further increasing adhesive strength or heat resistance.

Examples of the epoxy resin include bifunctional or polyfunctional epoxy resins such as a bisphenol A type, a bisphenol F type, a bisphenol S type, a brominated bisphenol A type, a hydrogenated bisphenol A type, a bisphenol AF type, a biphenyl type, a naphthalene type, a fluorene type, a phenol novolac type, a cresol novolac type, a trishydroxyphenylmethane type, and a tetraphenylolethane type, and epoxy resins such as a hydantoin type, and a glycidyl amine type such as a trisglycidyl isocyanurate type. One of these epoxy resins may be used alone, or two or more of them may be used in combination.

These epoxy resins may be, but not limited to, commercially available epoxy resins. Examples of such commercially available epoxy resins include, but are not limited to, jER 828 and jER 806 manufactured by Japan Epoxy Resin Co., Ltd., known as bisphenol type epoxy resins; YX8000 and YX8034 manufactured by Japan Epoxy Resin Co., Ltd., known as alicyclic epoxy resins; EP4000 and EP4005 manufactured by ADEKA CORPORATION; and Denacol EX-313, EX-512, EX-614B, and EX-810 manufactured by Nagase ChemteX Corporation, known as polyglycidyl ethers of polyalcohol.

Known oxetane resins may be used, such as xylylene dioxetane such as 1,4-bis{[(3-ethyl-3-oxetanyl)methoxy]methyl}benzene, 3-ethyl-3-{[3-ethyloxetane-3-yl]methoxy}methyl}oxetane, 3-ethylhexyloxetane, 3-ethyl-3-hydroxyoxetane, and 3-ethyl-3-hydroxymethyloxetane. One of these oxetane resins may be used alone, or two or more of them may be used in combination.

The oxetane resins may be, but not limited to, commercially available oxetane resins. Examples of such commercially available oxetane resins include, but are not limited to, ARON OXETANE OXT-121, OXT-221, OXT-101, and OXT-212 manufactured by TOAGOSEI CO., LTD.

One or both of such epoxy and oxetane resins may be used alone or in combination to form the photocurable pressure-sensitive adhesive composition of the present invention.

In an embodiment of the present invention, if added, the total amount of the epoxy resin and/or the oxetane resin is preferably 5 parts by weight or more, more preferably 10 parts by weight or more, and preferably 100 parts by weight or less, more preferably 70 parts by weight or less, based on 100 parts by weight of the graft polymer. When the total amount is 5 parts by weight or more, the effect of increasing adhering strength and heat resistance is significantly observed. If the total amount is more than 100 parts by weight, curing may proceed insufficiently.

In an embodiment of the present invention, the epoxy resin may be added to the graft polymer in which the cyclic ether group-containing monomer is grafted onto an acrylic polymer, so that a composition that does not cause oozing or the like before curing and is capable of forming a good photocurable pressure-sensitive adhesive layer can be prepared. This is considered to be because the grafted cyclic ether group can be compatibilized with a low molecular weight epoxy resin to form a strong pressure-sensitive adhesive layer structure.

In addition, a tackifier may be added to the photocurable pressure-sensitive adhesive composition of the present invention. The tackifier may be used in a total amount of 10 to 100 parts by weight, preferably 20 to 80 parts by weight, based on 100 parts by weight of the (meth)acryl-based polymer.

The photocurable pressure-sensitive adhesive composition of the present invention may also contain any known additive such as a powder of a colorant, a pigment or the like, a dye, a surfactant, a plasticizer, a tackifier, a surface lubricant, a leveling agent, a softening agent, an antioxidant, an age resistor, a light stabilizer, an ultraviolet absorbing agent, a polymerization inhibitor, an inorganic or organic filler, a metal powder, or a particulate or foil material, which may be added as appropriate depending on the intended use. Within the controllable range, a reducing agent may also be added to use a redox system.

The photocurable pressure-sensitive adhesive layer of the present invention is preferably formed on at least one side of a support.

The photocurable pressure-sensitive adhesive layer may be formed by a non-limiting process including applying the pressure-sensitive adhesive composition to one or both sides of a support material and drying the composition. Alternatively, the photocurable pressure-sensitive adhesive layer or the photocurable pressure-sensitive adhesive sheet may be formed by a method including forming a photocurable pressure-sensitive adhesive layer or layers on a separator (release film) and transferring the photocurable pressure-sensitive adhesive layer or layers onto one or both sides of a support material. Alternatively, a separator may be also used as the support material, and a backing-less double-coated pressure-sensitive adhesive sheet may also be subjected to practical use. Photocurable pressure-sensitive adhesive sheets may be used in the form of sheets, tapes or the like.

For example, the support material for the pressure-sensitive adhesive sheet may be any appropriate thin material such as a porous backing of paper, a cloth, a nonwoven fabric, or the like, a film or sheet of a plastic such as polyethylene, polypropylene, polyethylene terephthalate, or polyester, a net, a foam, a metal foil, or a laminate thereof. These support materials may be appropriately selected depending on the intended use of the pressure-sensitive adhesive sheet. The thickness of the support material is not restricted and may be determined as appropriate depending on the intended use.

More specifically, the photocurable pressure-sensitive adhesive layer is typically formed by a method including applying the pressure-sensitive adhesive composition to a release-treated separator or the like, removing the polymerization solvent and so on by drying, crosslinking the composition to form a pressure-sensitive adhesive layer, and then transferring the pressure-sensitive adhesive layer onto a support such as an optical member, or by a method including applying the pressure-sensitive adhesive composition to an optical member, removing the polymerization solvent and so on by drying, and photo-crosslinking the composition to form a pressure-sensitive adhesive layer on the optical member. When the pressure-sensitive adhesive is applied, one or more solvents other than the polymerization solvent may be newly added as needed.

A silicone peeling off liner is preferably used as the release-treated separator. The adhesive composition of the present invention may be applied to such a liner and dried to form a pressure-sensitive adhesive layer. In this process, any appropriate method may be used for drying the pressure-sensitive adhesive, depending on the purpose. A method of heating and drying the coating film is preferably used. The heating and drying temperature is preferably from 40° C. to 200° C., more preferably from 50° C. to 180° C., particularly preferably from 70° C. to 170° C. When the heating temperature is set within the range, a pressure-sensitive adhesive with a high level of adhesive properties can be obtained.

Any appropriate drying time may be used as needed. The drying time is preferably from 5 seconds to 20 minutes, more preferably from 5 seconds to 10 minutes, particularly preferably from 10 seconds to 5 minutes.

The surface of the support member may also be coated with an anchor layer or subjected to any adhesion-facilitating treatment such as corona treatment or plasma treatment, before the pressure-sensitive adhesive layer is formed. The surface of the pressure-sensitive adhesive layer may also be subjected to adhesion-facilitating treatment.

Various methods may be used to form the pressure-sensitive adhesive layer. Examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The thickness of the pressure-sensitive adhesive layer is not limited, but for example, from about 1 to 100 μm, preferably from 2 to 50 μm, more preferably from 2 to 40 μm, still more preferably from 5 to 35 μm.

When the pressure-sensitive adhesive layer is exposed, the pressure-sensitive adhesive layer may be protected with a sheet having undergone release treatment (a separator) before practical use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 μm, preferably from about 5 to about 100 μm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

The release-treated sheet may be used as is as a separator for the photocurable pressure-sensitive adhesive sheet, so that the process can be simplified.

The photocurable pressure-sensitive adhesive composition, the photocurable pressure-sensitive adhesive layer, and the photocurable pressure-sensitive adhesive sheet according to the present invention are cured when irradiated with a specific light beam. Therefore, the photocurable pressure-sensitive adhesive sheet of the present invention can be easily cured by light irradiation immediately before or after bonded to the adherend. For example, the photocurable pressure-sensitive adhesive sheet to be interposed between the adherend and another member is preferably used in the form of a double-coated pressure-sensitive adhesive tape or the like and can be cured by light irradiation at any time after the bonding. Such a curing reaction leads to reliable adhesion to the adherend or reliable adhesion between the adherend and the member.

The light to be applied is preferably, but not limited to, an active energy ray such as ultraviolet light, visible light, or an electron beam. A crosslinking process by ultraviolet irradiation may be performed using an appropriate ultraviolet light source such as a high-pressure mercury lamp, a low-pressure mercury lamp, an excimer laser, or a metal halide lamp. The ultraviolet irradiation dose in such a process may be selected as appropriate depending on the required degree of crosslinking. In general, the ultraviolet irradiation dose is preferably selected in the range of 0.2 to 10 $J/cm^2$. The temperature during the irradiation is preferably, but not limited to, about 140° C. or less, taking into account the heat resistance of the support.

The photocurable pressure-sensitive adhesive composition, the photocurable pressure-sensitive adhesive layer, and the photocurable pressure-sensitive adhesive sheet according to the present invention can be used in any application. For example, they can be used in a wide variety of applications including pressure-sensitive adhesive applications for optical members, applications for bonding semiconductor devices to organic boards or lead frames, applications for bonding automotive parts, and building applications.

EXAMPLES

Hereinafter, the present invention is more specifically described with reference to the Examples, which however are not intended to limit the present invention. In each example, "parts" and "%" are all by weight. Unless otherwise specified below, the conditions for allowing to stand at room temperature are 23° C. and 65% RH (for one hour or one week) in all cases.

<Measurement of Weight Average Molecular Weight>

The weight average molecular weight of the resulting (meth)acrylic polymer was measured by gel permeation chromatography (GPC) under the conditions shown below. The sample was dissolved in dimethylformamide to form a 0.1% by weight solution. The solution was allowed to stand overnight and then filtered through a 0.45 μm membrane filter. The resulting filtrate was used for the measurement.
Analyzer: HLC-8120GPC manufactured by TOSOH CORPORATION
Columns: $G7000H_{XL}+GMH_{XL}+GMH_{XL}$ manufactured by TOSOH CORPORATION
Column size: each 7.8 mmϕ×30 cm, 90 cm in total
Eluent: tetrahydrofuran (0.1% by weight in concentration)
Flow rate: 0.8 ml/minute
Detector: differential refractometer (RI)
Column temperature: 40° C.
Injection volume: 100 μl
Standard sample: polystyrene
<Measurement of Gel Fraction>

The dried and crosslinked pressure-sensitive adhesive (with an initial weight W1) was immersed and stored in an ethyl acetate solution at room temperature for 1 week. The insoluble matter was then taken out and measured for dry weight (W2). The gel fraction was determined according to the following formula: Gel fraction=(W2/W1)×100.

Example 1

Preparation of Acryl-Based Polymer

To a four-neck flask equipped with a stirring blade, a thermometer, a nitrogen gas introducing tube, and a condenser were added 99 parts by weight of n-butyl acrylate, 1 part by weight of 4-hydroxybutyl acrylate, 0.1 parts by weight of 2,2'-azobisisobutyronitrile as a polymerization initiator, and 200 parts by weight of ethyl acetate. Nitrogen gas was introduced for 1 hour to replace the air, while the mixture was gently stirred, and then a polymerization reaction was performed for 10 hours, while the temperature of the liquid in the flask was kept at about 55° C., so that a solution of an acryl-based polymer with a weight average molecular weight of 1,800,000 was prepared. The resulting acryl-based polymer had a glass transition temperature of 225 K.

(Preparation of Graft Polymer)

The resulting acryl-based polymer solution was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 40 parts of 3,4-epoxycyclohexylmethyl methacrylate, and 0.2 parts of benzoyl peroxide. Nitrogen gas was introduced for 1 hour to replace the air, while the mixture was gently stirred. Subsequently, the temperature of the liquid in the flask was kept at about 65° C. for 4 hours, and then a polymerization reaction was performed at 70° C. for 4 hours, so that a graft polymer solution was obtained.

(Formation of Pressure-Sensitive Adhesive Layer)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 2 parts by weight of allylsulfonium hexafluorophosphate (ESACURE 1064 manufactured by Lamberti S.p.A.) were added to the graft polymer solution to form a pressure-sensitive adhesive solution.

The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample was obtained.

(Light Irradiation)

Subsequently, sample pieces of 20 mm×100 mm were cut from the test sample and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 5 J/cm$^2$ on each sample piece using a metal halide UV lamp, and then a dark reaction process (at 40° C. for 48 hours) was performed. The 180° peel strength was measured for the sample and used as the adhering strength after light irradiation.

Example 2

Preparation of Acryl-Based Polymer

To a four-neck flask equipped with a stirring blade, a thermometer, a nitrogen gas introducing tube, and a condenser were added 99 parts by weight of n-butyl acrylate, 1 part by weight of 4-hydroxybutyl acrylate, 0.1 parts by weight of 2,2'-azobisisobutyronitrile as a polymerization initiator, and 200 parts by weight of ethyl acetate. Nitrogen gas was introduced for 1 hour to replace the air, while the mixture was gently stirred, and then a polymerization reaction was performed for 10 hours, while the temperature of the liquid in the flask was kept at about 55° C., so that a solution of an acryl-based polymer with a weight average molecular weight of 1,800,000 was prepared. The resulting acryl-based polymer had a glass transition temperature of 225 K.

(Preparation of Graft Polymer)

The resulting acryl-based polymer solution was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 20 parts of glycidyl methacrylate, and 0.12 parts of benzoyl peroxide. Nitrogen gas was introduced for 1 hour to replace the air, while the mixture was gently stirred. Subsequently, the temperature of the liquid in the flask was kept at about 65° C. for 4 hours, and then a polymerization reaction was performed at 70° C. for 4 hours, so that a graft polymer solution was obtained.

(Formation of Pressure-Sensitive Adhesive Layer)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 2 parts by weight of allylsulfonium hexafluorophosphate (ESACURE 1064 manufactured by Lamberti S.p.A.) were added to the graft polymer solution to form a pressure-sensitive adhesive solution.

The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample was obtained.

(Light Irradiation)

Subsequently, sample pieces of 20 mm×100 mm were cut from the test sample and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 5 J/cm$^2$ on each sample piece using a metal halide UV lamp, and then a dark reaction process (at 40° C. for 48 hours) was performed. The 180° peel strength was measured for the sample and used as the adhering strength after light irradiation.

Example 3

(Preparation of Acryl-Based Polymer)

To a four-neck flask equipped with a stirring blade, a thermometer, a nitrogen gas introducing tube, and a condenser were added 99 parts by weight of n-butyl acrylate, 1 part by weight of 4-hydroxybutyl acrylate, 0.1 parts by weight of 2,2'-azobisisobutyronitrile as a polymerization initiator, and 200 parts by weight of ethyl acetate. Nitrogen gas was introduced for 1 hour to replace the air, while the mixture was gently stirred, and then a polymerization reaction was performed for 10 hours, while the temperature of the liquid in the flask was kept at about 55° C., so that a solution of an acryl-based polymer with a weight average molecular weight of 1,800,000 was prepared. The resulting acryl-based polymer had a glass transition temperature of 225 K.

(Preparation of Graft Polymer)

The resulting acryl-based polymer solution was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 10 parts of 3,4-epoxycyclohexylmethyl methacrylate, 40 parts of oxetane methacrylate, and 0.3 parts of benzoyl peroxide. Nitrogen gas was introduced for 1 hour to replace the air, while the mixture was gently stirred. Subsequently, the temperature of the liquid in the flask was kept at about 65° C. for 4 hours, and then a polymerization reaction was performed at 70° C. for 4 hours, so that a graft polymer solution was obtained.

(Formation of Pressure-Sensitive Adhesive Layer)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 2 parts by weight of allylsulfonium hexafluorophosphate (ESACURE 1064 manufactured by Lamberti S.p.A.) were added to the graft polymer solution to form a pressure-sensitive adhesive solution.

The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample was obtained.

(Light Irradiation)

Subsequently, sample pieces of 20 mm×100 mm were cut from the test sample and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 5 J/cm$^2$ on each sample piece using a metal halide UV lamp, and then a dark reaction process (at 40° C. for 48 hours) was performed. The 180° peel strength was measured for the sample and used as the adhering strength after light irradiation.

Example 4

Preparation of Acryl-Based Polymer

To a four-neck flask equipped with a stirring blade, a thermometer, a nitrogen gas introducing tube, and a condenser were added 99 parts by weight of n-butyl acrylate, 1 part by weight of 4-hydroxybutyl acrylate, 0.1 parts by weight of 2,2'-azobisisobutyronitrile as a polymerization initiator, and 200 parts by weight of ethyl acetate. Nitrogen gas was introduced for 1 hour to replace the air, while the mixture was gently stirred, and then a polymerization reaction was performed for 10 hours, while the temperature of the liquid in the flask was kept at about 55° C., so that a solution of an acryl-based polymer with a weight average molecular weight of 1,800,000 was prepared. The resulting acryl-based polymer had a glass transition temperature of 225 K.

(Preparation of Graft Polymer)

The resulting acryl-based polymer solution was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 10 parts of 3,4-epoxycyclohexylmethyl methacrylate, 10 parts of 2-ethylhexyl acrylate, and 0.1 parts of benzoyl peroxide. Nitrogen gas was introduced for 1 hour to replace the air, while the mixture was gently stirred. Subsequently, the temperature of the liquid in the flask was kept at about 60° C. for 4 hours, and then a polymerization reaction was performed at 70° C. for 4 hours, so that a graft polymer solution was obtained.

(Formation of Pressure-Sensitive Adhesive Composition)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)

Sample 1A for Use in Adhering Strength Measurement

The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample 1A was obtained.

Subsequently, sample pieces of 20 mm×100 mm were cut from the test sample 1A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 1 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)

Sample 1B for Use in Gel Fraction Measurement

The pressure-sensitive adhesive solution was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 120° C. for 3 minutes, so that a test sample 1B was obtained. MRF-38 was also bonded to the surface of the pressure-sensitive adhesive layer. The gel fraction was measured for the sample not undergoing light irradiation and used as the gel fraction before light irradiation.

Light irradiation was performed at 1 J/cm$^2$ on the test sample 1B using a metal halide UV lamp, and then a dark reaction process (at 50° C. for 48 hours) was performed. The gel fraction was measured for the sample and used as the gel fraction after light irradiation.

Example 5

An acryl-based polymer solution, which was prepared as in Example 4, was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 10 parts of 3,4-epoxycyclohexylmethyl methacrylate, 10 parts of isobornyl acrylate, and 0.1 parts of benzoyl peroxide. Nitrogen gas was introduced for 1 hour to replace the air, while the mixture was gently stirred. Subsequently, the temperature of the liquid in the flask was kept at about 60° C. for 4 hours, and then a polymerization reaction was performed at 70° C. for 4 hours, so that a graft polymer solution was obtained.

(Formation of Pressure-Sensitive Adhesive Composition)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 2A for Use in Adhering Strength Measurement The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample 2A was obtained.

Subsequently, sample pieces of 20 mm×100 mm were cut from the test sample 2A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 1 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 2B for Use in Gel Fraction Measurement The pressure-sensitive adhesive solution was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 120° C. for 3 minutes, so that a test sample 2B was obtained. MRF-38 was also bonded to the surface of the pressure-sensitive adhesive layer. The gel fraction was measured for the sample not undergoing light irradiation and used as the gel fraction before light irradiation.

Light irradiation was performed at 1 J/cm$^2$ on the test sample 2B using a metal halide UV lamp, and then a dark reaction process (at 50° C. for 48 hours) was performed. The gel fraction was measured for the sample and used as the gel fraction after light irradiation.

Example 6

An acryl-based polymer solution, which was prepared as in Example 4, was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 20 parts of 3,4-epoxycyclohexylmethyl methacrylate, and 0.1 parts of benzoyl peroxide. Nitrogen gas was introduced for 1 hour to replace the air, while the mixture was gently stirred. Subsequently, the temperature of the liquid in the flask was kept at about 60° C. for 4 hours, and then a polymerization reaction was performed at 70° C. for 4 hours, so that a graft polymer solution was obtained.

(Formation of Pressure-Sensitive Adhesive Composition)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 3A for Use in Adhering Strength Measurement The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample 3A was obtained.

Subsequently, sample pieces of 20 mm×100 mm were cut from the test sample 3A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 1 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 3B for Use in Gel Fraction Measurement The pressure-sensitive adhesive solution was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 120° C. for 3 minutes, so that a test sample 3B was obtained. MRF-38 was also bonded to the surface of the pressure-sensitive adhesive layer. The gel fraction was measured for the sample not undergoing light irradiation and used as the gel fraction before light irradiation.

Light irradiation was performed at 1 J/cm$^2$ on the test sample 3B using a metal halide UV lamp, and then a dark reaction process (at 50° C. for 48 hours) was performed. The gel fraction was measured for the sample and used as the gel fraction after light irradiation.

Example 7

An acryl-based polymer solution, which was prepared as in Example 4, was diluted with ethyl acetate to a solids content of 25%, so that a dilute solution (I) was prepared. To a four-neck flask equipped with a stirring blade, a thermometer, a nitrogen gas introducing tube, and a condenser were added 400 parts by weight of the dilute solution (I), 10 parts of 4-hydroxybutyl acrylate glycidyl ether, 10 parts of isobornyl acrylate, and 0.1 parts of benzoyl peroxide. Nitrogen gas was introduced for 1 hour to replace the air, while the mixture was gently stirred. Subsequently, the temperature of the liquid in the flask was kept at about 60° C. for 4 hours, and then a polymerization reaction was performed at 70° C. for 4 hours, so that a graft polymer solution was obtained.

(Formation of Pressure-Sensitive Adhesive Composition)

Subsequently, based on 100 parts by weight of the solids of the resulting graft polymer solution, 0.3 parts by weight of a trimethylolpropane adduct of hexamethylenediisocyanate (CORONATE HL manufactured by NIPPON POLYURETHANE INDUSTRY CO., LTD.) and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 4A for Use in Adhering Strength Measurement The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample 4A was obtained.

Subsequently, sample pieces of 20 mm×100 mm were cut from the test sample 4A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 3 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 4B for Use in Gel Fraction Measurement The pressure-sensitive adhesive solution was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 150° C. for 3 minutes, so that a test sample 4B was obtained. MRF-38 was also bonded to the surface of the pressure-sensitive adhesive layer. The gel fraction was measured for the sample not undergoing light irradiation and used as the gel fraction before light irradiation.

Light irradiation was performed at 3 J/cm$^2$ on the test sample 4B using a metal halide UV lamp, and then a dark reaction process (at 50° C. for 48 hours) was performed. The gel fraction was measured for the sample and used as the gel fraction after light irradiation.

Example 8

Formation of Pressure-Sensitive Adhesive Composition

Based on 100 parts by weight of the solids of a graft polymer solution, which was prepared as in Example 7, 20 parts by weight of YX8000 manufactured by Japan Epoxy Resin Co., Ltd., 0.3 parts by weight of a trimethylolpropane adduct of hexamethylenediisocyanate (CORONATE HL manufactured by NIPPON POLYURETHANE INDUSTRY CO., LTD.), 0.3 parts by weight of benzoyl peroxide, and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 5A for Use in Adhering Strength Measurement The pressure-sensitive adhesive solution prepared as described above was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 150° C. for 3 minutes, so that a test sample 5A was obtained.

Subsequently, sample pieces of 20 mm×100 mm were cut from the test sample 5A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 3 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 5B for Use in Gel Fraction Measurement The pressure-sensitive adhesive solution prepared as described above was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 150° C. for 3 minutes, so that a test sample 5B was obtained. MRF-38 was also bonded to the surface of the pressure-sensitive adhesive layer. The gel fraction was measured for the sample not undergoing light irradiation and used as the gel fraction before light irradiation.

Light irradiation was performed at 3 J/cm$^2$ on the test sample 5B using a metal halide UV lamp, and then a dark reaction process (at 50° C. for 48 hours) was performed. The gel fraction was measured for the sample and used as the gel fraction after light irradiation.

Example 9

Formation of Pressure-Sensitive Adhesive Composition

Based on 100 parts by weight of the solids of a graft polymer solution, which was prepared as in Example 7, 50 parts by weight of YX8000 manufactured by Japan Epoxy Resin Co., Ltd., 0.3 parts by weight of a trimethylolpropane adduct of hexamethylenediisocyanate (CORONATE HL manufactured by NIPPON POLYURETHANE INDUSTRY CO., LTD.), 0.3 parts by weight of benzoyl peroxide, and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 6A for Use in Adhering Strength Measurement The pressure-sensitive adhesive solution prepared as described above was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 150° C. for 3 minutes, so that a test sample 6A was obtained.

Subsequently, sample pieces of 20 mm×100 mm were cut from the test sample 6A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 3 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 6B for Use in Gel Fraction Measurement The pressure-sensitive adhesive solution prepared as described above was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 150° C. for 3 minutes, so that a test sample 6B was obtained. MRF-38 was also bonded to the surface of the pressure-sensitive adhesive layer. The gel fraction was measured for the sample not undergoing light irradiation and used as the gel fraction before light irradiation.

Light irradiation was performed at 3 J/cm$^2$ on the test sample 6B using a metal halide UV lamp, and then a dark reaction process (at 50° C. for 48 hours) was performed. The gel fraction was measured for the sample and used as the gel fraction after light irradiation.

Example 10

Formation of Pressure-Sensitive Adhesive Composition

Based on 100 parts by weight of the solids of a graft polymer solution, which was prepared as in Example 1, 20 parts by weight of ARON OXETANE OXT-221 manufactured by TOAGOSEI CO., LTD., 0.3 parts by weight of a trimethylolpropane adduct of hexamethylenediisocyanate (CORONATE HL manufactured by NIPPON POLYURETHANE INDUSTRY CO., LTD.), and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 7A for Use in Adhering Strength Measurement The pressure-sensitive adhesive solution prepared as described above was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample 7A was obtained.

Subsequently, sample pieces of 20 mm×100 mm were cut from the test sample 7A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 2 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 7B for Use in Gel Fraction Measurement The pressure-sensitive adhesive solution was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 120° C. for 3 minutes, so that a test sample 7B was obtained. The test sample 7B was attached to a separator. The gel fraction was measured for the sample not undergoing light irradiation and used as the gel fraction before light irradiation.

Light irradiation was performed at 2 J/cm$^2$ on the test sample 7B using a metal halide UV lamp, and then a dark reaction process (at 50° C. for 48 hours) was performed. The gel fraction was measured for the sample and used as the gel fraction after light irradiation.

Example 11

Formation of Pressure-Sensitive Adhesive Composition

Based on 100 parts by weight of the solids of a graft polymer solution, which was prepared as in Example 1, 40 parts by weight of ARON OXETANE OXT-221 manufactured by TOAGOSEI CO., LTD., 0.3 parts by weight of a trimethylolpropane adduct of hexamethylenediisocyanate (CORONATE HL manufactured by NIPPON POLYURETHANE INDUSTRY CO., LTD.), and 1 part by weight of allylsulfonium hexafluorophosphate (ESACURE 1064 manufactured by Lamberti S.p.A.) were added to the graft polymer solution to form a pressure-sensitive adhesive solution.

(Formation of Pressure-Sensitive Adhesive Layer)
Sample 8A for Use in Adhering Strength Measurement The pressure-sensitive adhesive solution was applied to one side of a 25 μm thick polyethylene terephthalate (PET) film (S-10 manufactured by TORAY INDUSTRIES, INC.) so that a 20 μm thick pressure-sensitive adhesive layer could be formed after drying, and the coating was dried at 120° C. for 3 minutes, so that a test sample 8A was obtained.

Subsequently, sample pieces of 20 mm×100 mm were cut from the test sample 8A and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 2 J/cm$^2$ on each sample piece using a metal halide UV lamp, and then a dark reaction process (at 50° C. for 48 hours) was performed. The 180° peel strength was measured for the sample and used as the adhering strength after light irradiation.

(Formation of Pressure-Sensitive Adhesive Layer)
Sample 8B for Use in Gel Fraction Measurement The pressure-sensitive adhesive solution prepared as described above was applied to one side of a silicone-treated, 38 μm thick, PET film (MRF-38 manufactured by Mitsubishi Plastics, Inc.) so that a 20 μm thick pressure-sensitive adhesive layer could be formed after drying, and the coating was dried at 120° C. for 3 minutes, so that a test sample 8B was obtained. The test sample 8B was attached to a separator. The gel fraction was measured for the sample not undergoing light irradiation and used as the gel fraction before light irradiation.

Light irradiation was performed at 2 J/cm$^2$ on the test sample 8B using a metal halide UV lamp, and then a dark reaction process (at 50° C. for 48 hours) was performed. The gel fraction was measured for the sample and used as the gel fraction after light irradiation.

Comparative Example 1

Preparation of Seed Polymer

To a four-neck flask equipped with a stirring blade, a thermometer, a nitrogen gas introducing tube, and a condenser were added 99 parts by weight of n-butyl acrylate, 1 part by weight of 4-hydroxybutyl acrylate, 0.1 parts by weight of 2,2'-azobisisobutyronitrile as a polymerization initiator, and 200 parts by weight of ethyl acetate. Nitrogen gas was introduced for 1 hour to replace the air, while the mixture was gently stirred, and then a polymerization reaction was performed for 10 hours, while the temperature of the liquid in the flask was kept at about 55° C., so that a solution of an acryl-based polymer with a weight average molecular weight of 1,800,000 was prepared.

(Formation of Pressure-Sensitive Adhesive Layer)

Subsequently, based on 100 parts by weight of the solids of the resulting seed polymer solution, 0.3 parts by weight of a trimethylolpropane adduct of hexamethylenediisocyanate (CORONATE HL manufactured by NIPPON POLYURETHANE INDUSTRY CO., LTD.) and 2 parts by weight of allylsulfonium hexafluorophosphate (ESACURE 1064 manufactured by Lamberti S.p.A.) were added to the seed polymer solution to form a pressure-sensitive adhesive solution.

The pressure-sensitive adhesive solution was applied to one side of a 25 μm thick polyethylene terephthalate (PET) film (manufactured by TORAY INDUSTRIES, INC.) so that a 20 μm thick pressure-sensitive adhesive layer could be formed after drying, and the coating was dried at 120° C. for 3 minutes, so that a test sample was obtained.

(Light Irradiation)

Subsequently, sample pieces of 20 mm×100 mm were cut from the test sample and bonded to a 2 mm thick acrylic plate (ACRYLITE manufactured by Mitsubishi Rayon Co., Ltd.) and a 0.4 mm thick BA plate (a surface-finished BA steel plate of SUS430), respectively, by one reciprocation of a 2 kg roller. At this stage, the 180° peel strength was measured (at a peel rate of 300 mm/minute) for each sample piece and used as the adhering strength before light irradiation. Light irradiation was performed at 5 J/cm² on each sample piece using a metal halide UV lamp, and then a dark reaction process (at 40° C. for 48 hours) was performed. The 180° peel strength was measured for the sample and used as the adhering strength after light irradiation.

Comparative Example 2

Preparation of Acryl-Based Polymer

To a four-neck flask equipped with a stirring blade, a thermometer, a nitrogen gas introducing tube, and a condenser were added 99 parts by weight of n-butyl acrylate, 1 part by weight of 4-hydroxybutyl acrylate, 5 parts by weight of glycidyl methacrylate, 0.1 parts by weight of 2,2'-azobisisobutyronitrile as a polymerization initiator, and 210 parts by weight of ethyl acetate. Nitrogen gas was introduced for 1 hour to replace the air, while the mixture was gently stirred, and then a polymerization reaction was performed, while the temperature of the liquid in the flask was kept at about 55° C. As a result, 1 hour after the start of the polymerization, the mixture gelled.

Table 1 shows the results of the adhering strength evaluation performed on the samples obtained in the examples and the comparative examples.

TABLE 1

| | | Tackiness (N/20 mm) | | | |
| | | Acrylic plate | | BA plate | |
| | Irradiation dose | Before irradiation | After irradiation | Before irradiation | After irradiation |
|---|---|---|---|---|---|
| Example 1 | 5 J/cm² | 7 | 20 anchoring | 4.5 | 25 anchoring |
| Example 2 | 5 J/cm² | 7 | 18 anchoring | 4 | 22 anchoring |
| Example 3 | 5 J/cm² | 6.5 | 16 anchoring | 4 | 21 anchoring |
| Example 4 | 1 J/cm² | 7 | 17 anchoring | 4 | 20 anchoring |
| Example 5 | 1 J/cm² | 7 | 19 anchoring | 4 | 23 anchoring |
| Example 6 | 1 J/cm² | 7 | 11 | 4 | 7 |
| Example 7 | 3 J/cm² | 7 | 18 anchoring | 4 | 21 anchoring |
| Example 8 | 3 J/cm² | 5 | 7.5 | 5 | 10 |
| Example 9 | 3 J/cm² | 6 | 17 anchoring | 5 | 17 anchoring |
| Example 10 | 2 J/cm² | 4 | 8 | 4 | 10 |
| Example 11 | 2 J/cm² | 5 | 9 | 6 | 12 |
| Comparative Example 1 | 5 J/cm² | 6 | 7 | 3 | 3.5 |

Table 2 shows the results of the evaluation of the gel fraction of the pressure-sensitive adhesive layer performed on the samples obtained in the examples and the comparative examples.

TABLE 2

| | | Gel fraction (%) | |
| | Irradiation dose | Before irradiation | After irradiation |
|---|---|---|---|
| Example 4 | 1 J/cm² | 38 | 85 |
| Example 5 | 1 J/cm² | 40 | 87 |
| Example 6 | 1 J/cm² | 35 | 52 |
| Example 7 | 3 J/cm² | 41 | 82 |
| Example 8 | 3 J/cm² | 36 | 75 |
| Example 9 | 3 J/cm² | 32 | 73 |
| Example 10 | 2 J/cm² | 37 | 78 |
| Example 11 | 2 J/cm² | 34 | 74 |

The invention claimed is:

1. A photocurable pressure-sensitive adhesive composition, comprising:
   a graft polymer comprising a (meth)acryl-based polymer and a chain that contains a cyclic ether group-containing monomer component and is graft-polymerized onto the (meth)acryl-based polymer together with at least one other monomer capable of undergoing co-grafting such that the weight ratio of the cyclic ether group-containing monomer to the at least one other monomer is from 80/20 to 20/80; and
   a cationic photopolymerization initiator.

2. The photocurable pressure-sensitive adhesive composition according to claim 1, further comprising a crosslinking agent.

3. The photocurable pressure-sensitive adhesive composition according to claim 1, further comprising 5 to 100 parts by weight of an epoxy resin and/or an oxetane resin, based on 100 parts by weight of the graft polymer.

4. The photocurable pressure-sensitive adhesive composition according to claim 1, wherein the cyclic ether group-containing monomer is one or both of an epoxy group-containing monomer and an oxetane group-containing monomer.

5. The photocurable pressure-sensitive adhesive composition according to claim 1, wherein the (meth)acryl-based polymer has a glass transition temperature of 250 K or less.

6. A photocurable pressure-sensitive adhesive composition, comprising:
   a graft polymer comprising a (meth)acryl-based polymer and a chain that contains a cyclic ether group-containing monomer component and is graft-polymerized onto the (meth)acryl-based polymer; and
   a cationic photopolymerization initiator,
   wherein the (meth)acryl-based polymer contains 0.2 to 10% by weight of a hydroxyl group-containing monomer unit, based on the total amount of the (meth)acryl-based polymer.

7. A photocurable pressure-sensitive adhesive composition, comprising:
   a graft polymer comprising a (meth)acryl-based polymer and a chain that contains a cyclic ether group-containing monomer component and is graft-polymerized onto the (meth)acryl-based polymer; and
   a cationic photopolymerization initiator,
   wherein the graft polymer is a product of graft polymerization of 100 parts by weight of the (meth)acryl-based polymer, 2 to 50 parts by weight of the cyclic ether group-containing monomer, and 5 to 50 parts by weight of another monomer in the presence of 0.02 to 5 parts by weight of a peroxide.

8. The photocurable pressure-sensitive adhesive composition according to claim 1, wherein the cationic photopolymerization initiator is at least one selected from the group consisting of an allylsulfonium hexafluorophosphate salt, a sulfonium hexafluorophosphate salt, and bis(alkylphenyl)iodonium hexafluorophosphate.

9. A photocurable pressure-sensitive adhesive layer obtained by crosslinking the photocurable pressure-sensitive adhesive composition according to claim 1.

10. A photocurable pressure-sensitive adhesive sheet, comprising:
    a support; and
    the photocurable pressure-sensitive adhesive layer according to claim 9 formed on at least one side of the support.

11. A method for producing the photocurable pressure-sensitive adhesive composition according to claim 1, comprising the steps of:
    preparing a (meth)acryl-based polymer and then graft-polymerizing a cyclic ether group-containing monomer onto the (meth)acryl-based polymer to prepare a graft polymer; and
    mixing a cationic photopolymerization initiator with the graft polymer.

12. The method according to claim 11, wherein in the step of preparing a graft polymer, preparing the (meth)acryl-based polymer is followed by graft-polymerizing a cyclic ether group-containing monomer and another monomer onto the (meth)acryl-based polymer.

13. The photocurable pressure-sensitive adhesive composition according to claim 1, wherein the (meth)acryl-based polymer comprises at least 50% by weight of an alkyl (meth)acrylate having an alkyl group of 4 or more carbon atoms.

14. The photocurable pressure-sensitive adhesive composition according to claim 1, wherein the cationic initiator is present in an amount of 0.1 to 5 parts by weight, based on 100 parts by weight of the (meth)acryl-based polymer.

* * * * *